(12) United States Patent
Kojima

(10) Patent No.: US 7,735,798 B2
(45) Date of Patent: Jun. 15, 2010

(54) SEAT SLIDING APPARATUS FOR VEHICLE

(75) Inventor: Yasuhiro Kojima, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 319 days.

(21) Appl. No.: 11/529,265

(22) Filed: Sep. 29, 2006

(65) Prior Publication Data

US 2007/0069098 A1  Mar. 29, 2007

(30) Foreign Application Priority Data

Sep. 29, 2005  (JP) .............................. 2005-283492

(51) Int. Cl.
*F16M 13/00* (2006.01)
(52) U.S. Cl. ................... 248/429; 248/419; 248/424; 248/430; 296/65.13; 296/65.14; 296/65.15; 297/344.11
(58) Field of Classification Search ............ 248/419, 248/424, 429, 430; 296/65.13, 65.14, 65.15; 297/344.11
See application file for complete search history.

(56) References Cited

U.S. PATENT DOCUMENTS

| | | | | |
|---|---|---|---|---|
| 2,149,946 A | * | 3/1939 | Whedon et al. | 248/429 |
| 4,190,226 A | * | 2/1980 | Letournoux et al. | 248/429 |
| 4,742,983 A | * | 5/1988 | Nihei | 248/429 |
| 4,781,354 A | * | 11/1988 | Nihei et al. | 248/429 |
| 5,676,341 A | * | 10/1997 | Tarusawa et al. | 248/430 |
| 5,918,846 A | * | 7/1999 | Garrido | 248/429 |
| 5,918,847 A | * | 7/1999 | Couasnon | 248/430 |
| 6,036,267 A | * | 3/2000 | Downey et al. | 297/341 |
| 6,264,159 B1 | * | 7/2001 | Su | 248/430 |
| 6,286,799 B1 | * | 9/2001 | Fujii | 248/430 |
| 6,328,272 B1 | * | 12/2001 | Hayakawa et al. | 248/429 |
| 6,416,130 B2 | * | 7/2002 | Yamada et al. | 297/344.11 |
| 6,488,249 B1 | | 12/2002 | Girardi et al. | |
| 6,688,574 B2 | * | 2/2004 | Okazaki et al. | 248/424 |

(Continued)

FOREIGN PATENT DOCUMENTS

JP  4-163237 A  6/1992

(Continued)

OTHER PUBLICATIONS

European Search Report dated Jan. 21, 2009.

(Continued)

*Primary Examiner*—J. Allen Shriver, II
*Assistant Examiner*—Nkeisha J Smith
(74) *Attorney, Agent, or Firm*—Buchanan Ingersoll & Rooney PC

(57) ABSTRACT

A seat sliding apparatus for a vehicle includes a lower rail fixed to a vehicle floor, an upper rail fixed to a vehicle seat and supported by the lower rail so as to be movable relative thereto, and a lock mechanism including multiple lock portions provided on the lower rail along a longitudinal direction thereof, a spindle provided on the upper rail and having a rotation axis that extends in a longitudinal direction of the upper rail, and a lock member rotating about the rotation axis and engageable with or disengageable from the lock portions. The spindle is supported by a recess portion formed in a surface of the upper rail in an inwardly extending manner.

13 Claims, 5 Drawing Sheets

U.S. PATENT DOCUMENTS

| | | | |
|---|---|---|---|
| 6,691,971 B2* | 2/2004 | Yamada et al. | 248/430 |
| 6,869,057 B2* | 3/2005 | Matsumoto et al. | 248/430 |
| 6,923,415 B2* | 8/2005 | Yokoi et al. | 248/424 |
| 6,926,443 B2* | 8/2005 | Niimi et al. | 384/34 |
| 6,953,178 B2* | 10/2005 | Yamada et al. | 248/429 |
| 7,147,195 B2* | 12/2006 | Danjo et al. | 248/430 |
| 7,318,573 B2* | 1/2008 | Yamada et al. | 248/424 |
| 2002/0060281 A1* | 5/2002 | Okazaki et al. | 248/424 |
| 2003/0094558 A1* | 5/2003 | Yamada et al. | 248/429 |
| 2003/0230696 A1* | 12/2003 | Yamada et al. | 248/424 |
| 2005/0056761 A1* | 3/2005 | Danjo et al. | 248/429 |
| 2006/0022109 A1* | 2/2006 | Yamada et al. | 248/429 |
| 2007/0090260 A1* | 4/2007 | Kojima | 248/424 |
| 2007/0090263 A1* | 4/2007 | Yamada et al. | 248/429 |
| 2007/0176072 A1* | 8/2007 | Ikegaya et al. | 248/429 |
| 2008/0048087 A1* | 2/2008 | Kojima et al. | 248/430 |

FOREIGN PATENT DOCUMENTS

| | | |
|---|---|---|
| JP | 8-282347 A | 10/1996 |
| JP | 2004-231106 | 8/2004 |
| JP | 2005-67217 | 3/2005 |

OTHER PUBLICATIONS

Chinese Office Action dated Mar. 6, 2009 in corresponding Chinese Application No. 2006101397856, and its English translation.

* cited by examiner

SEAT SLIDING APPARATUS FOR VEHICLE

CROSS REFERENCE TO RELATED APPLICATIONS

This application is based on and claims priority under 35 U.S.C. §119 to Japanese Patent Application No. 2005-283492, filed on Sep. 29, 2005, the entire content of which is incorporated herein by reference.

FIELD OF THE INVENTION

This invention generally relates to a seat sliding apparatus for a vehicle.

BACKGROUND

Known seat sliding apparatuses for a vehicle are disclosed in JP2005-67217A and JP2004-231106A. Each seat sliding apparatus for a vehicle disclosed includes a lower rail fixed to a vehicle floor, an upper rail fixed to a vehicle seat and supported by the lower rail so as to be movable relative thereto, and a lock mechanism. The lock mechanism includes multiple lock portions provided on the lower rail along a longitudinal direction thereof, a spindle provided on the upper rail and having a rotation axis extending in a longitudinal direction of the upper rail, and a lock member rotatable about the rotation axis and engageable with or disengageable from the lock portions.

According to the seat sliding apparatus for a vehicle disclosed in JP2005-67217A, a rod (i.e. spindle) is supported by two brackets each having a V-shaped groove, thereby avoiding looseness of the rod, eccentricity of the rotation axis, and the like.

Further, according to the seat sliding apparatus for a vehicle disclosed in JP2004-231106A, a lock teeth portion of the lock member is arranged inside of sections of the upper rail and the lower rail, thereby saving space.

However, according to the seat sliding apparatus for a vehicle disclosed in JP2005-67217A, a bracket for supporting the rod (i.e. spindle) is required, which may cause an increase of manufacturing cost such as a parts cost and an assembly cost. Further, according to the seat sliding apparatus for a vehicle disclosed in JP2004-231106A, a rotation axis (spindle) and portions other than the lock teeth portion of the lock member are arranged outside of the section of the upper rail. A sufficient space cannot be obtained accordingly.

Thus, a need exists for a seat sliding apparatus for a vehicle that can be manufactured at a low cost and that can save space.

SUMMARY OF THE INVENTION

According to an aspect of the present invention, a seat sliding apparatus for a vehicle includes a lower rail fixed to a vehicle floor, an upper rail fixed to a vehicle seat and supported by the lower rail so as to be movable relative thereto, and a lock mechanism including multiple lock portions provided on the lower rail along a longitudinal direction thereof, a spindle provided on the upper rail and having a rotation axis that extends in a longitudinal direction of the upper rail, and a lock member rotating about the rotation axis and engageable with or disengageable from the lock portions. The spindle is supported by a recess portion formed in a surface of the upper rail in an inwardly extending manner.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
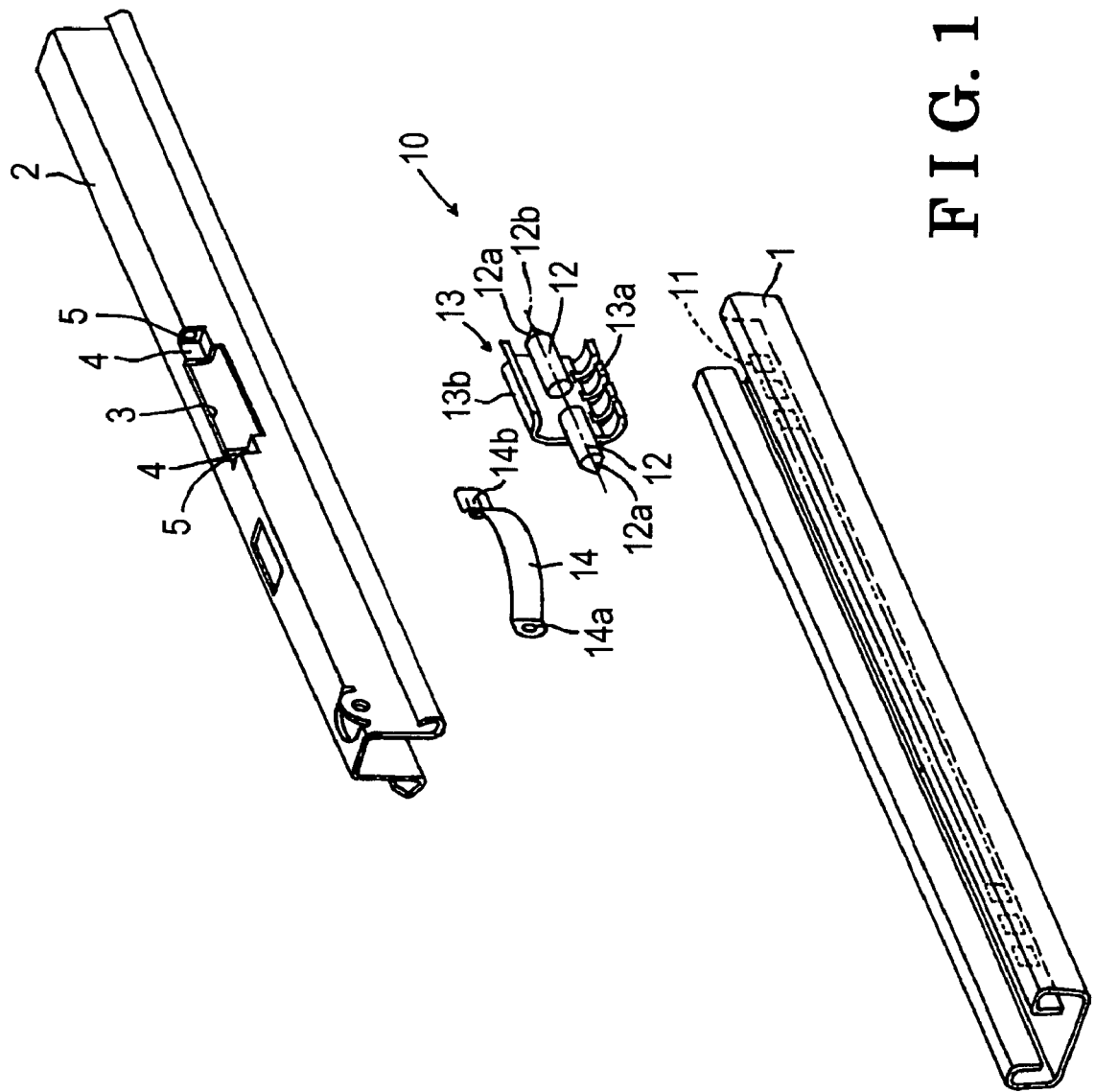
FIG. 1 is an exploded perspective view of a seat sliding apparatus for a vehicle according to a first embodiment of the present invention.
Figure 2:
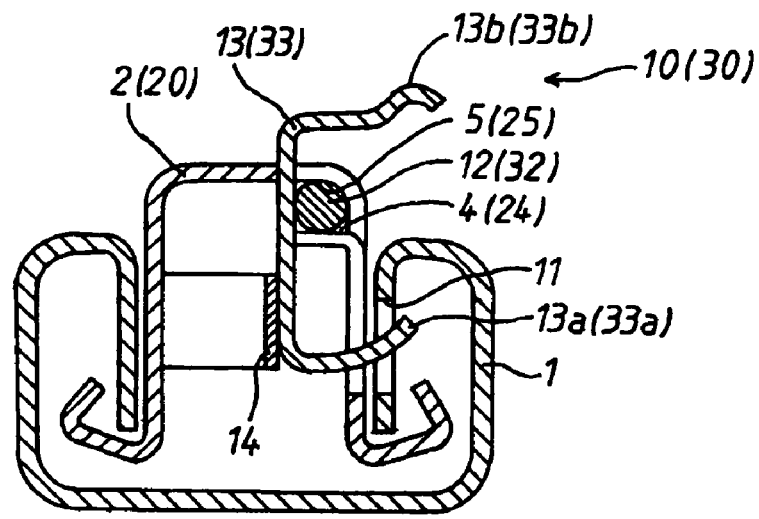
FIG. 2 is a cross-sectional view of the seat sliding apparatus for a vehicle as in a locked state according to the first and a second embodiments of the present invention.
Figure 3:
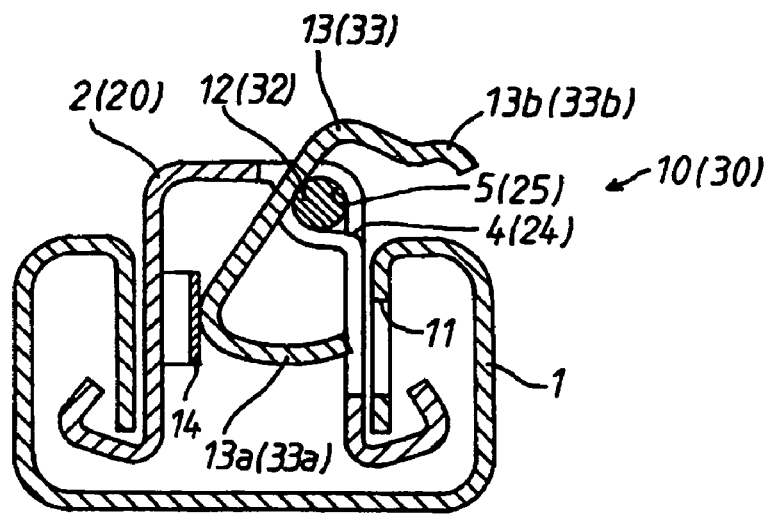
FIG. 3 is a cross-sectional view of the seat sliding apparatus for a vehicle as in an unlocked state according to the first and second embodiments of the present invention.
Figure 6:
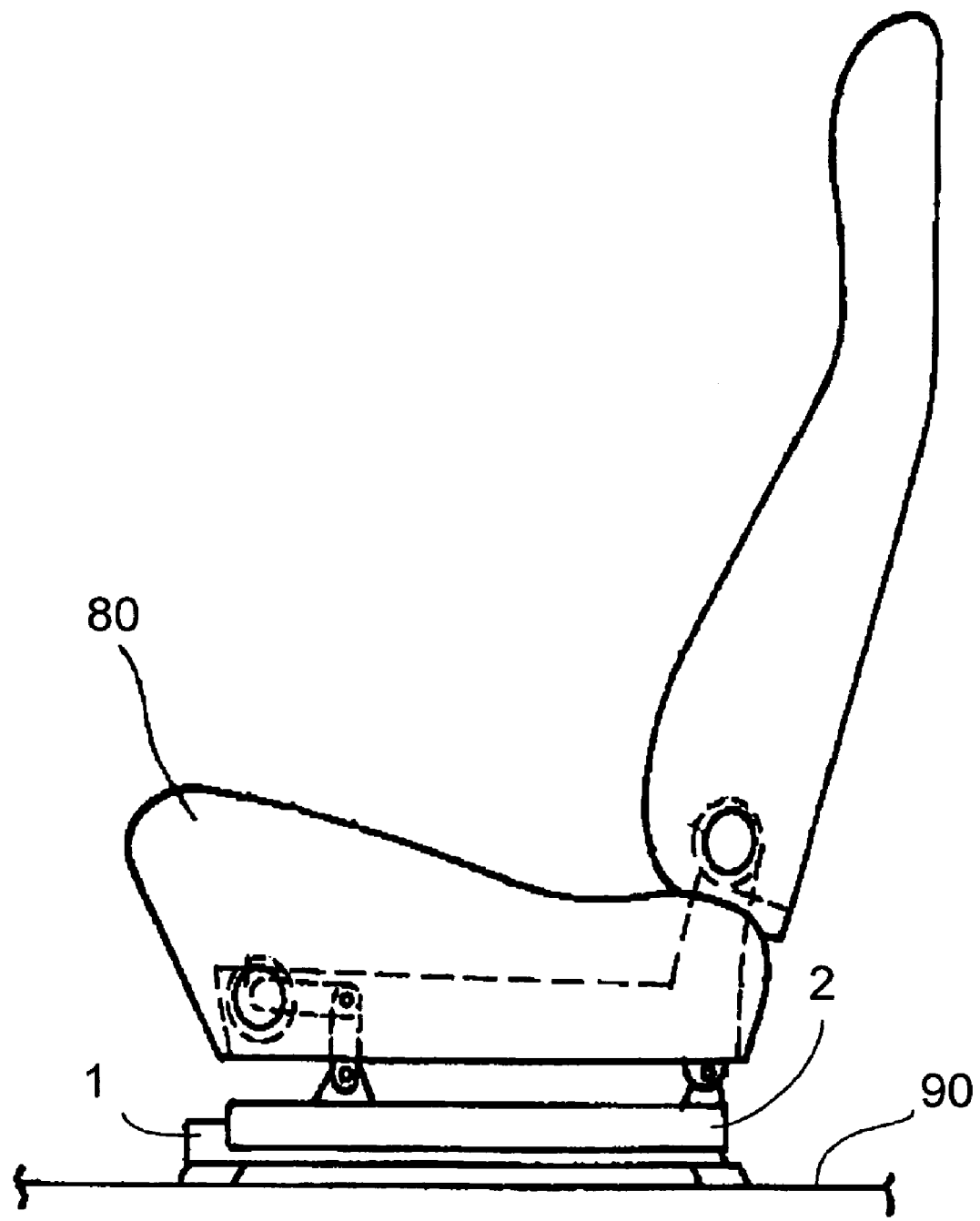
FIG. 6 is a whole side view of a vehicle seat.

Embodiments of the present invention will be explained with reference to the attached drawings. FIGS. 1 to 3 show a seat sliding apparatus for a vehicle according to a first embodiment. As shown in FIG. 6, the seat sliding apparatus for a vehicle includes a pair of lower rails 1 fixed to a vehicle floor 90 on both sides in a width direction respectively, and a pair of upper rails 2 fixed to a vehicle seat 80 on both sides in the width direction respectively and supported by the lower rails 1 so as to be movable relative thereto in a vehicle longitudinal direction. Further, as shown in FIG. 1, the seat sliding apparatus for a vehicle includes a lock mechanism 10 provided between each lower rail 1 and each upper rail 2.

Multiple lock bores 11 that constitute the lock mechanism 10 are formed on an inner side of each lower rail 1 along a longitudinal direction thereof. A hole 3 into which a lock lever 13 (to be explained later) is inserted is formed on the upper rail 2. Recess portions 4 by which spindles 12 (to be explained later) are supported are provided on respective ends of the hole 3. Each recess portion 4 is formed in a surface of the upper rail 2 in an inwardly extending manner. In addition, opening portions 5 engaging with tapered faces 12a (to be explained later) are formed on end portions of the recess portions 4, respectively.

The lock mechanism 10 includes the lock bores 11 serving as a lock portion, the spindles 12, and the lock lever 13 serving as a lock member. A spindle is divided into two pieces, i.e. two spindles 12, each of which has a tapered face 12a at an end. A diameter of the tapered face 12a is gradually smaller towards a tip end portion. The spindles 12 are respectively connected to both ends of the lock lever 13 by welding, and include a rotation axis 12b extending in a longitudinal direction of the upper rail 2. The lock lever 13 includes a lock hook portion 13a arranged on a lower side of the spindles 12 and engageable with or disengageable from the lock bores 11. Further, the lock lever 13 includes an interlock portion 13b arranged on an upper side of the spindles 12. A pressing portion of an operation lever (not shown) that operates to rotate the lock lever 13 makes contact or engages with the interlock portion 13b.

A plate spring 14 is arranged within sections of the rails 1 and 2. The plate spring 14 includes a fitting bore 14a at one end, by means of which the plate spring 14 is fixed to the upper rail 2. Further, the plate spring 14 includes an elongated bore 14b at the other end, by means of which the plate spring 14 is movable in the longitudinal direction of the upper rail 2. The plate spring 14 includes an arc-shaped bent portion on a center, by means of which the plate spring 14 biases the lock lever 13 in a direction in which the lock hook portion 13a engages with the lock bores 11.

Next, an assembly process of the lock mechanism 10 will be explained. First, the tapered faces 12a of the two spindles 12 engage with the opening portions 5 respectively so as to be inserted thereinto with no gaps. Then, the lock lever 13 makes contact with the spindles 12 from an inside of the upper rail 2 in such a manner that an axis of the spindles 12 matches the rotation axis 12b. The two spindles 12 are connected by welding to the respective ends of the lock lever 13 in the longitudinal direction. Finally, the plate spring 14 is assembled onto the upper rail 2. The lock mechanism 10 is assembled in the aforementioned manner and the lock lever 13 is rotatable about the rotation axis 12b.

An operation of the seat sliding apparatus for a vehicle having the aforementioned structure will be explained below. In the case of a locked state of the seat sliding apparatus as shown in FIG. 2, the operation lever is not operated and the interlock portion 13b is not pressed by the pressing portion of the operation lever. Thus, the plate spring 14 biases the lock lever 13 so that the lock hook portion 13a is inserted into the lock bores 11 to engage therewith. The upper rail 2 is locked so as not to be movable relative to the lower rail 1 accordingly.

In the case of an unlocked state of the seat sliding apparatus as shown in FIG. 3, the operation lever is operated and thus the interlock portion 13b is pressed downwardly by the pressing portion of the operation lever. Thus, the lock lever 13 rotates against a biasing force of the plate spring 14, thereby causing the lock hook portion 13a to disengage from the lock bores 11. The upper rail 2 is unlocked so as to be movable relative to the lower rail 1. In the unlocked state, if the upper rail 2 is moved along with the vehicle seat 80 relative to the lower rail 1 to a desired position while the operation lever is operated, and then the operation of the operation lever is stopped, the locked state can be established.

Figure 4:
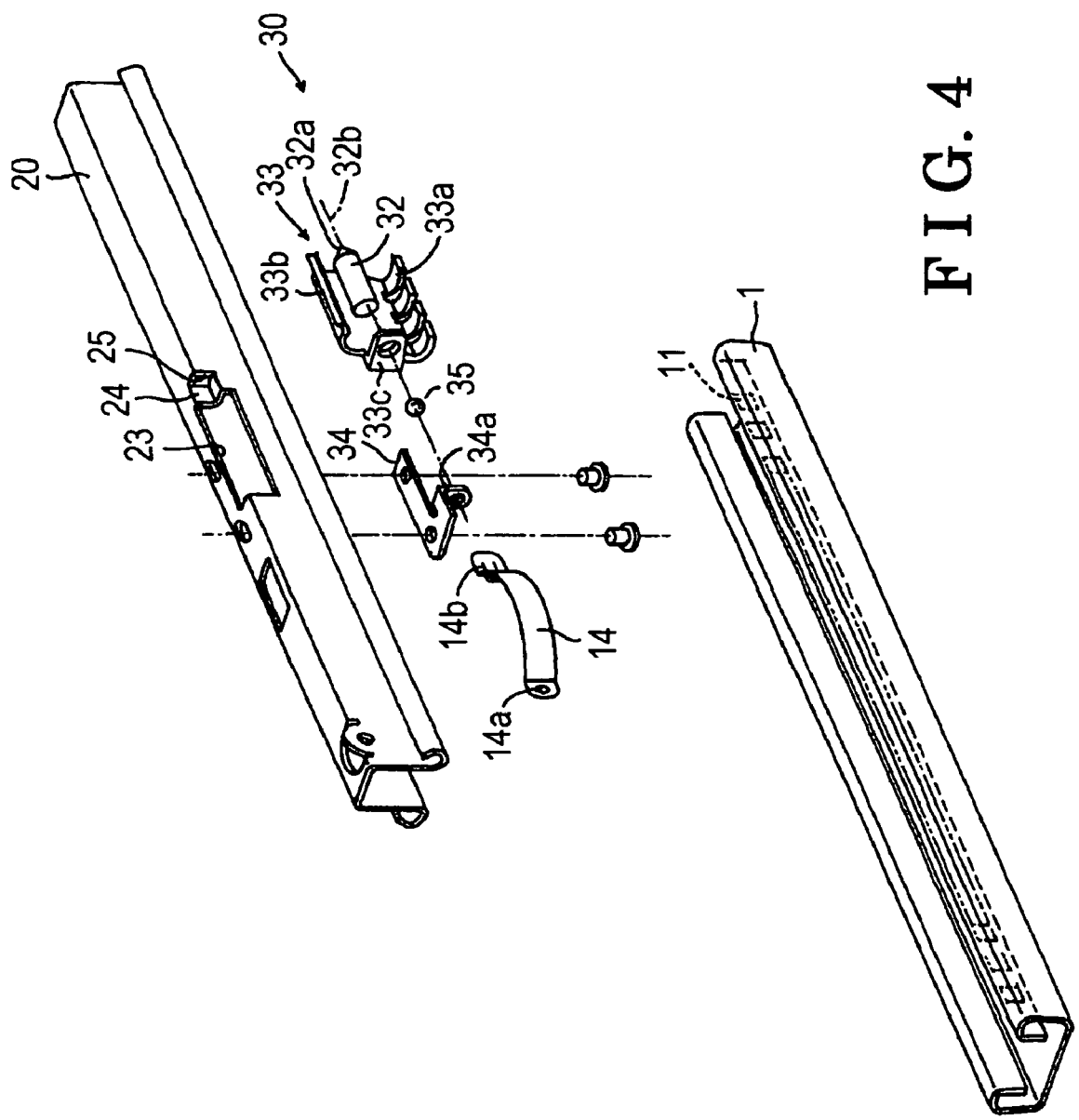
FIG. 4 is an exploded perspective view of the seat sliding apparatus for a vehicle according to the second embodiment of the present invention.

FIGS. 2 to 4 show the seat sliding apparatus for a vehicle according to a second embodiment. In the second embodiment, the seat sliding apparatus for a vehicle includes a pair of lower rails 1 fixed to a vehicle floor 90 on both sides in a width direction respectively, a pair of upper rails 20 fixed to a vehicle seat 80 on both sides in the width direction respectively and supported by the lower rails 1 so as to be movable relative thereto in a vehicle longitudinal direction, and a lock mechanism 30 provided between each lower rail 1 and each upper rail 20. The parts or components having the same structure as that of the first embodiment bear the same numbers as the first embodiment and thus explanation is omitted.

The upper rail 20 includes a hole 23 into which a lock lever 33 (to be explained later) is inserted. A recess portion 24 by which a spindle is supported is provided on one end of the hole 23. The recess portion 24 is formed in a surface of the upper rail 20 in an inwardly extending manner. An opening portion 25 engaging with a tapered face 32a of the spindle 32 is formed on an end portion of the recess portion 24. In addition, a bracket 34 by which a first end of the lock lever 33 is supported is fixed to the other end of the hole 23, facing the recess portion 24.

The lock mechanism 30 includes lock bores 11 serving as a lock portion, the spindle 32, and the lock lever 33 serving as a lock member. The spindle 32 has the tapered face 32a at an end. A diameter of the tapered face 32a is gradually smaller towards a tip end portion. The spindle 32 is connected to a second end of the lock lever 13 by welding. The lock lever 33 includes a rotation axis 32b extending in a longitudinal direction of the upper rail 20 as in a state in which the lock lever 33 is assembled onto the upper rail 20.

The lock lever 33 includes a lock hook portion 33a arranged on a lower side of the spindle 32 and engageable with or disengageable from the lock bores 11. Further, the lock lever 33 includes an interlock portion 33b arranged on an upper side of the spindle 32. A pressing portion of an operation lever (not shown) that operates to rotate the lock lever 33 engages with the interlock portion 33b. A rotation plate 33c is integrally formed on the first end of the lock lever 33.

The bracket 34 includes a supporting plate 34a facing the rotation plate 33c of the lock lever 33. The supporting plate 34a and the rotation plate 33c sandwich a ball 35 therebetween. Accordingly, the lock lever 33 is rotatable about the rotation axis 32b of the lock lever 33.

Next, an assembly process of the lock mechanism 30 will be explained below. First, the lock lever 33 the second end of which is connected to the spindle 32 is inserted into the hole 23 of the upper rail 20. The tapered face 32a of the spindle 32 engages with the opening portion 25 so as to be inserted thereinto with no gaps. Then, the bracket 34 is pressed against the lock lever 33 while the supporting plate 34a and the rotation plate 33c sandwich the ball 35 therebetween. After the bracket 34 and the lock lever 33 are arranged so as not to be loose in a direction of the rotation axis 32b, the bracket 34 is fixed to the upper rail 20 by riveting. In this case, since a rivet inserting bore formed so as to extend through the upper rail 20 and into which a rivet is inserted is elongated in a direction of the rotation axis 32b, and the ball 35 is sandwiched between the supporting plate 34a and the rotation plate 33c, looseness of the lock lever 33 in a direction of the rotation axis 32b can be reduced. Finally, the plate spring 14 is assembled onto the upper rail 20. The lock mechanism 30 is assembled in the aforementioned manner and the lock lever 33 is rotatable about the rotation axis 32b.

An operation of the seat sliding apparatus for a vehicle having the aforementioned structure will be explained. In the case of a locked state of the seat sliding apparatus as shown in FIG. 2, the operation lever is not operated, and the interlock portion 33b is not pressed by the pressing portion of the operation lever. Thus, the plate spring 14 biases the lock lever 33 so that the lock hook portion 33a is inserted into the lock bores 11 to engage therewith. Thus, the upper rail 20 is locked so as not to movable relative to the lower rail 1.

In the case of an unlocked state of the seat sliding apparatus as shown in FIG. 3, the operation lever is operated and thus the interlock portion 33b is pressed downwardly by the pressing portion of the operation lever. Thus, the lock lever 33 rotates against a biasing force of the plate spring 14, thereby causing the lock hook portion 33a to disengage from the lock bores 11. The upper rail 20 is unlocked so as to be movable relative to the lower rail 1. In the unlocked state, if the upper rail 20 is moved along with the vehicle seat 80 relative to the lower rail 1 to a desired position while the operation lever is operated, and then the operation of the operation lever is stopped, the locked state can be established.

Figure 5:
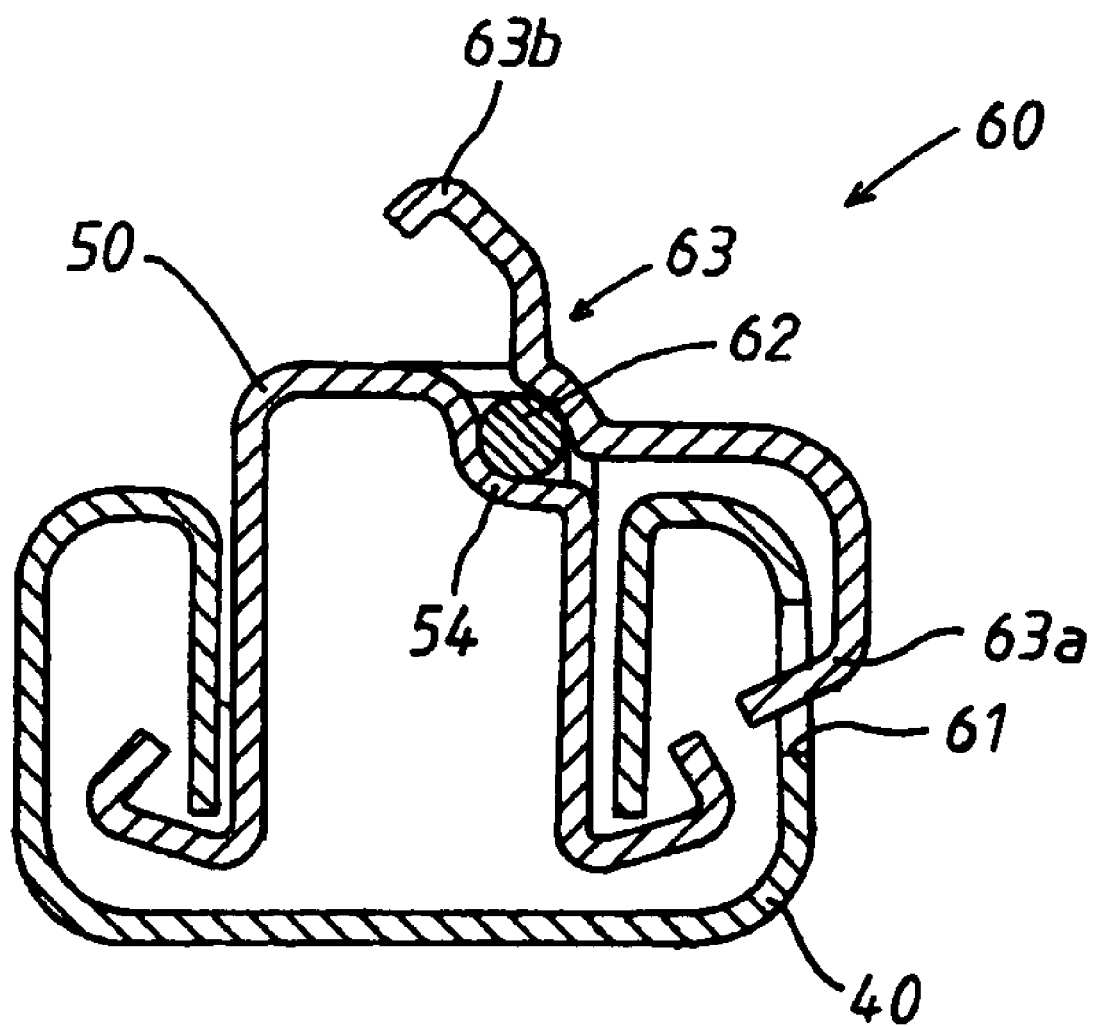
FIG. 5 is a cross-sectional view of the seat sliding apparatus for a vehicle according to the third embodiment.

A third embodiment will be explained with reference to FIG. 5, which is a cross-sectional view of the seat sliding apparatus for a vehicle. The seat sliding apparatus for a vehicle according to the third embodiment includes a pair of lower rails 40 fixed to a vehicle floor 90 on both sides in a width direction respectively, a pair of upper rails 50 fixed to a vehicle seat 80 on both sides in the width direction respectively and supported by the lower rails 40 so as to be movable in a vehicle longitudinal direction relative to the lower rails 40, and a lock mechanism 60 provided between each lower rail 40 and each upper rail 50.

Multiple lock bores 61 that constitute the lock mechanism 60 are formed on an outer side of each lower rail 40 along a longitudinal direction thereof. The upper rail 50 includes a recess portion 54 by which a spindle 62 (to be explained later) is supported. The recess portion 54 is formed in a surface of the upper rail 50 in an inwardly extending manner.

The lock mechanism 60 includes the lock bores 61 serving as a lock portion, the spindle 62, and a lock lever 63 serving as a lock member. The spindle 62 is connected to the lock lever 63 by welding and supported by the recess portion 54 of the upper rail 50. The lock lever 63 includes a lock hook portion 63*a* on a lower side that is engageable with or disengageable from the lock bores 61. The lock lever 63 further includes an interlock portion 63*b* on an upper side with which a pressing portion of an operation lever that operates to rotate the lock lever 63 makes contact. Both ends of the spindle 62 can be supported either by a recess portion formed in a surface of the upper rail 50 in an inwardly extending manner, or a bracket fixed to the upper rail 50.

According to the aforementioned third embodiment, the lock lever 63 is arranged outside of the sections of the rails 40 and 50. However, the spindle 62 is arranged inside of the sections of the rails 40 and 50, which may achieve the same advantage or effect as the first and second embodiments.

Effects of the aforementioned embodiments are as follows.

According to the aforementioned embodiments, the spindle 12, 32, or 62 is supported by the recess portion 4, 24, or 54 formed in a surface of the upper rail 2, 20, or 50 in an inwardly extending manner. Thus, a member for supporting the spindle 12, 32, or 62 is not required. In addition, the spindle 12, 32, or 62 is arranged inside of the section of both the upper rail 2, 20, or 50 and the lower rail 1 or 40 and thus a low manufacturing cost and space saving can be achieved. Further, design flexibility can be increased.

In addition, according to the aforementioned embodiments, the tapered face 12*a* or 32*a* of the spindle 12, or 32 engages with the opening portion 5 or 25, which can restrict a movement of the spindle 12 or 32 towards the opening portion 5 or 25. Thus, looseness of a vehicle seat in a vehicle longitudinal direction can be prevented and therefore comfortable seating feeling can be obtained.

Further, according to the aforementioned embodiments, the tapered faces 12*b* of the spindles 12 engage with the opening portions 5 respectively on both ends of the lock lever 13. Thus, the movement of the spindles 12 in the longitudinal direction of the upper rail 2 can be surely restricted. Therefore, looseness of the vehicle seat in the vehicle longitudinal direction can be further prevented, thereby further securing a comfortable seating feeling.

Furthermore, according to the aforementioned embodiments, one end of the spindle 32 is supported by the recess portion 24. Thus, the low manufacturing cost and space saving can be achieved as compared to a case in which the both ends of the spindle 32 are supported by brackets.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat sliding apparatus for a vehicle, comprising:
   a lower rail adapted to be fixed to a vehicle floor;
   an upper rail adapted to be fixed to a vehicle seat and supported by the lower rail so as to be movable relative thereto, the upper rail comprising a hole extending in a longitudinal direction of the upper rail; and
   a lock mechanism including multiple lock portions provided on the lower rail along a longitudinal direction thereof, a spindle provided on the upper rail and having a rotation axis that extends in the longitudinal direction of the upper rail, and a lock member connected to the spindle to rotate with the spindle about the rotation axis for selective engagement with and disengagement from the lock portions, the lock member being within the upper rail when disengaged from the lock portions, the lock member passing through the hole when being brought into engagement with the lock portions, wherein an upper surface of the upper rail has a recess portion integral with the upper rail, the recess portion extending inwardly toward an interior of the upper rail and being located adjacent a longitudinal end of the hole in the upper rail, the recess portion rotatably supporting the spindle, and the recess portion being exposed upwardly at the upper surface of the upper rail.

2. A seat sliding apparatus for a vehicle according to claim 1, further comprising:
   a tapered face formed on an end portion of the spindle and having a diameter that is gradually smaller towards a tip end; and
   an opening portion provided on an end of the recess portion and engaging with the tapered face.

3. A seat sliding apparatus for a vehicle according to claim 2, wherein the recess portion possesses opposite ends, the lock member also possessing opposite ends, the opening portion is provided on both ends of the recess portion respectively, and the spindle is divided into two pieces which are inserted into the opening portion respectively and thereafter connected to both ends of the lock member by welding so as to be coaxial with the rotation axis.

4. A seat sliding apparatus for a vehicle according to claim 1, wherein one end of the lock member is supported by the recess portion while an other end of the lock member is supported by a bracket fixed to the upper rail so as to face the recess portion.

5. A seat sliding apparatus for a vehicle according to claim 2, wherein one end of the lock member is supported by the recess portion while an other end of the lock member is supported by a bracket fixed to the upper rail so as to face the recess portion.

6. A seat sliding apparatus for a vehicle, comprising:
   a lower rail extending in a longitudinal direction and fixable to a vehicle floor;
   an upper rail extending in the longitudinal direction and fixable to a vehicle seat, the upper rail being movably supported on the lower rail so that the upper is slidable relative to the lower rail in the longitudinal direction
   the lower rail comprising a plurality of spaced apart lock bores
   a spindle rotatably mounted on the upper rail to rotate about a rotation axis extending in the longitudinal direction;
   a lock member connected to the spindle so that the spindle and the lock member rotate together when the spindle is rotate;
   the spindle being rotatable to rotate the lock member between one position forming a locked state of the seat sliding apparatus in which a portion of the lock member extends through a hole in the upper rail and through at least one of the lock bores in the lower rail so that the upper rail is locked against movement in the longitudinal direction relative to the lower rail, and another position forming an unlocked state of the seat sliding apparatus in which the portion of the lock member is withdrawn from the lock bores in the lower rail so that the upper rail is slidable in the longitudinal direction relative to the lower rail;

wherein the upper rail includes a pair of laterally spaced side walls and an inner space between the laterally spaced side walls;

a portion of one of the side walls that is laterally spaced from the other side wall being recessed to define a recessed portion on which the spindle is rotatably supported; and wherein an upper wall of the upper rail is recessed inwardly at two spaced apart locations each defining a recessed portion on which is rotatably supported the spindle.

7. A seat sliding apparatus for a vehicle according to claim 6, wherein the recessed portion is located at one longitudinal end of the hole in the upper rail.

8. A seat sliding apparatus for a vehicle according to claim 6, wherein the spindle comprises two pieces.

9. A seat sliding apparatus for a vehicle, comprising:
a lower rail extending in a longitudinal direction and fixable to a vehicle floor;
an upper rail extending in the longitudinal direction and fixable to a vehicle seat, the upper rail being movably supported on the lower rail so that the upper rail is slidable relative to the lower rail in the longitudinal direction;
the lower rail comprising a plurality of spaced apart lock bores;
a spindle rotatably mounted on the upper rail to rotate about a rotation axis extending in the longitudinal direction;
a lock member connected to the spindle so that the spindle and the lock member rotate together when the spindle is rotated;
the spindle being rotatable to rotate the lock member between one position forming a locked state of the seat sliding apparatus in which a portion of the lock member extends through a hole in the upper rail and through at least one of the lock bores in the lower rail so that the upper rail is locked against movement in the longitudinal direction relative to the lower rail, and another position forming an unlocked state of the seat sliding apparatus in which the portion of the lock member is withdrawn from the lock bores in the lower rail so that the upper rail is slidable in the longitudinal direction relative to the lower rail;

the upper rail including a pair of laterally spaced side walls between which an inner space is defined;

a portion of one of the side walls that is laterally spaced from the other side wall being recessed to define a recessed portion on which the spindle is rotatably supported; and wherein the pair of laterally spaced side walls comprises laterally spaced apart first and second side walls between which is defined the inner space, the first side wall being recessed to define the recessed portion on which the spindle is rotatably supported, and wherein the lock member which rotates together with the spindle does not pass through the second side wall.

10. The seat sliding apparatus according to claim 1, wherein the upper rail includes a pair of laterally spaced side walls between which is defined an inner space, and a portion of one of the side walls that is laterally spaced from the other side wall being recessed to define the recess portion on which the spindle is rotatably supported.

11. The seat sliding apparatus according to claim 1, wherein the upper rail includes a pair of laterally spaced side walls between which is defined an inner space, and one of the side walls is recessed toward the inner space of the upper rail to define the recess portion on which the spindle is rotatably supported.

12. The seat sliding apparatus according to claim 1, wherein the upper rail includes a pair of laterally spaced first and second side walls between which is defined an inner space, the first side wall being recessed to define the recess portion on which the spindle is rotatably supported, and wherein the lock member which rotates together with the spindle does not pass through a hole in the second side wall.

13. The seat sliding apparatus according to claim 6, wherein the pair of laterally spaced side walls comprises laterally spaced apart first and second side walls between which is defined the inner space, the first side wall being recessed to define the recessed portion on which the spindle is rotatably supported, and wherein the lock member which rotates together with the spindle does not pass through a hole in the second side wall.

* * * * *